(12) United States Patent
Lee et al.

(10) Patent No.: US 9,013,645 B2
(45) Date of Patent: Apr. 21, 2015

(54) POLARIZING PANEL AND DISPLAY DEVICE HAVING THE SAME

(75) Inventors: Dong-Yoon Lee, Seoul (KR);
Sung-Hoon Kim, Seoul (KR)

(73) Assignee: Samsung Display Co., Ltd. (KR)

( * ) Notice: Subject to any disclaimer, the term of this patent is extended or adjusted under 35 U.S.C. 154(b) by 733 days.

(21) Appl. No.: 13/210,215

(22) Filed: Aug. 15, 2011

(65) Prior Publication Data
US 2012/0140142 A1 Jun. 7, 2012

(30) Foreign Application Priority Data
Dec. 6, 2010 (KR) .................. 10-2010-0123347

(51) Int. Cl.
| | | |
|---|---|---|
| G02F 1/1335 | (2006.01) | |
| G02F 1/1333 | (2006.01) | |
| G02F 1/01 | (2006.01) | |
| G02B 27/26 | (2006.01) | |
| H04N 13/04 | (2006.01) | |

(52) U.S. Cl.
CPC .............. *G02F 1/0136* (2013.01); *G02B 27/26* (2013.01); *H04N 13/0434* (2013.01)

(58) Field of Classification Search
USPC ........................................................ 349/15
See application file for complete search history.

(56) References Cited

U.S. PATENT DOCUMENTS

| | | | |
|---|---|---|---|
| 7,907,223 B2* | 3/2011 | Maeda ............................. | 349/15 |
| 2009/0051835 A1* | 2/2009 | Park et al. ........................ | 349/15 |
| 2011/0032438 A1* | 2/2011 | Yun et al. ......................... | 349/15 |

FOREIGN PATENT DOCUMENTS

| | | |
|---|---|---|
| JP | 2007-003910 A | 1/2007 |
| KR | 10-2010-0006461 A | 1/2010 |
| KR | 10-2010-0016569 A | 2/2010 |

\* cited by examiner

*Primary Examiner* — Wen-Ying P Chen
(74) *Attorney, Agent, or Firm* — Innovation Counsel LLP (57) ABSTRACT

A polarizing panel includes a first substrate, a second substrate and an interposed first liquid crystal layer. The first substrate includes a plurality of spaced apart and segment electrodes and segments of a first light-blocking member disposed within interval areas between the segment electrodes. The second substrate faces the first substrate to include a common electrode facing the segment electrodes. The first liquid crystal layer is able to selectively apply a first polarizing effect to light rays passing therethrough when in a corresponding first state and to apply a different second polarizing effect to passing through light rays when in a corresponding second state, where the first and second states can be selectively chosen by voltages applied to the segment electrodes. The light-blocking member can reduce image crosstalk lights from being emitted from the interval areas between the segment electrodes, so that a crosstalk component of a formed 3D image may be prevented or reduced due to light-blocking effects.

12 Claims, 11 Drawing Sheets

POLARIZING PANEL AND DISPLAY DEVICE HAVING THE SAME

PRIORITY STATEMENT

This application claims priority under 35 U.S.C. §119 to Korean Patent Application No. 10-2010-0123347, filed on Dec. 6, 2010 in the Korean Intellectual Property Office (KIPO), the contents of which application are herein incorporated by reference in their entirety.

BACKGROUND

1. Field of Disclosure

The present disclosure of invention relates to a polarizing panel and a display device having the polarizing panel. More particularly, example embodiments of the present disclosure relate to a polarizing panel capable of enhancing display quality and a display device having the polarizing panel.

2. Description of Related Technology

Generally, a display apparatus is perceived by users to display a two-dimensional image (hereinafter, referred to as a 2D image). Recently, according to increasing demands for 3-dimensional images (hereinafter, referred to as a 3D image) in usage fields such as that of virtual game playing, movies and so on, display apparatuses for displaying a perceived 3D image are being developed.

A 3D image display apparatus may display a 3D image by using a binocular parallax effect through two eyes of the observer. For example, since two eyes of the observer are spaced apart from each other, different images viewed at different angles through each of the two eyes may be supplied for processing by the observer's brain. That is, the stereoscopic image display apparatus may use the binocular parallax mechanisms of the observer's visual system to create the illusion of 3D imagery.

The 3D image display apparatuses that use the binocular parallax effect may be divided into a stereoscopic type display apparatus and an auto-stereoscopic type display apparatus according as whether special glasses are necessary or not for perceiving the 3D imagery. The stereoscopic type display apparatuses may be further subdivided into a passive polarized glasses type display apparatus, an active shutter glasses type display apparatus, etc. In the passive polarized type display apparatus, a pair of glasses having different but substantially fixed polarizing axes for each of the lenses used by a user are provided. In the active shutter glasses type display apparatus, a left-eye image and a right-eye image are divided over time (time domain multiplexed) to be displayed thereon periodically, and a pair of glasses in which a left-eye shutter and a right-eye shutter are closed and opened in synchronization with the time domain multiplexed presentation of left and right images is used. According to the active shutter glasses type display apparatus, the left-eye shutter or the right-eye shutter is opened during a vertical blanking interval after the left-eye image or the right-eye image is displayed on a display panel, and then the respective left-eye image or the right-eye image may be captured by the corresponding eye of the observer.

A passive polarized type display apparatus may be provided that includes a front polarizing panel that divides (splits) the formed imagery on the display panel in a time multiplexed manner into a left-eye directed image and a right-eye directed image. A pair of passive polarized glasses may then be used in conjunction with the time multiplexing front polarizing panel where the passive glasses have a corresponding left lens and a corresponding right lens to selectively transmit the differently polarized images to the intended respective eyeballs. However, due to the way the image is formed for example in an LCD display panel and the way the left and right polarized lights are transmitted through the polarizing panel, an undesired crosstalk image may be generated in the passive glasses/time domain multiplexing type of polarizing display apparatus. Moreover, due to a limitation of a resistive characteristics normally present for a transparent electrode used in the time multiplexing polarizing panel, it is difficult to employ the display apparatus in a large sized display device.

It is to be understood that this background of the technology section is intended to provide useful background for understanding the here disclosed technology and as such, the technology background section may include ideas, concepts or recognitions that were not part of what was known or appreciated by those skilled in the pertinent art prior to corresponding invention dates of subject matter disclosed herein.

SUMMARY

When a sequentially scanned LCD panel or the like is used to form an underlying image for the polarizing panel, the underlying image develops in steps, for example, one row of pixels at a time within a given frame. Thus during the formation of a new frame, part of the previous frame still remains until all the rows of the panel have been repainted with new image data. If the polarizing panel is flashed into one polarizing state or another all at once, there can be a cross talk problem in that part of the LCD panel is showing the older frame data rather than the newer frame data. However, in accordance with present disclosure, the polarizing panel is sequentially activated one horizontal segment after the next in synchronization with the driving of the gate lines of the sequentially scanned LCD panel. Additionally, the polarizing panel has its own black matrix for blocking leakage of oblique light from a not-yet-repainted group of pixel rows so as to further reduce cross talk. Additionally, the black matrix of the polarizing panel may include a metal conductor that carries the driving electrical signals of a corresponding segment electrode thus reducing a problem of having too high of an RC time constant factor. Example embodiments of the present disclosure therefore provide a polarizing panel capable of preventing a crosstalk of an image from being generated and decreasing a resistance-capacitance (RC) delay factor.

Example embodiments of the present disclosure also provide a display device having the above-mentioned polarizing panel.

According to one aspect of the present disclosure, a polarizing panel includes a first substrate, a second substrate and a liquid crystal layer. The first substrate includes a plurality of segment electrodes arranged in a first direction to be extended in a second direction crossing the first direction and a light-blocking member disposed on an interval area between the segment electrodes. The second substrate faces the first substrate to include a common electrode facing the segment electrodes. The liquid crystal layer transmits a first polarized light or a second polarized light in accordance with an electric field between the segment electrodes and the common electrode.

In an example embodiment, the light-blocking member may overlap with an end portion of a first segment electrode and an end portion of a second segment electrode. The light-blocking member may include an organic material.

In an example embodiment, the light-blocking member may include a line part disposed on the interval area, and a contact portion protruded from the line part to be connected to the first segment electrode. The light-blocking member may include a metal material. The light-blocking member may include a first light-blocking layer including a metal material and a second light-blocking layer including an organic material.

In an example embodiment, the light-blocking member may be overlapped with an end portion of a first segment electrode by making contact with the end portion of the first segment electrode, and may be spaced apart from an end portion of a second segment electrode. The light-blocking member may include a conductive light-blocking material.

According to another aspect of the present disclosure, a display device includes a display panel, a light source module and a polarizing panel. The display panel displays a left-eye image and a right-eye image. The light source module provides the display panel with lights. The polarizing panel includes a plurality of segment electrodes and a first light-blocking member disposed on an interval area of adjacent segment electrodes to selectively transmit a first polarized light and a second polarized light transmitted through the display panel.

In an example embodiment, the display panel may further include a plurality of gate lines extended in an extending direction of the segment electrodes and a second light-blocking member overlapped with the gate lines, and the first light-blocking member may be overlapped with the second light-blocking member within an area in which the second light-blocking member is formed.

In an example embodiment, the display device may further include a segments driving part. The segments driving part applies a driving voltage of a first level to the segment electrodes when the left-eye image is displayed on the display panel, and applies a driving voltage of a second level to the segment electrodes when the right-eye image is displayed on the display panel.

In an example embodiment, the first light-blocking member may be overlapped with an end portion of a first segment electrode and an end portion of a second segment electrode. The first light-blocking member may include a same material as the second light-blocking member. The segments driving part may directly apply the driving voltages to the segment electrodes.

In an example embodiment, the first light-blocking member may include a line part disposed on the interval area, and a contact portion protruded from the line part to be connected to the first segment electrode. The first light-blocking member may include a metal material. The first light-blocking member may include a first light-blocking layer including a metal material and a second light-blocking layer including an organic material.

In an example embodiment, the first light-blocking member may be overlapped with an end portion of a first segment electrode by making contact with the end portion of the first segment electrode, and may be spaced apart from an end portion of a second segment electrode. The light-blocking member may include a conductive light-blocking material. The segments driving part may directly apply the driving voltages to respective portions of the first light-blocking member.

According to some example embodiments, a light-blocking member is formed on an interval area between segment electrodes, so that a crosstalk component may be prevented due to light-blocking effects. Moreover, a driving voltage is applied to the segment electrodes through a light-blocking member having a conductive property, so that it may be employed in a large size display device.

BRIEF DESCRIPTION OF THE DRAWINGS

The above and other features and advantages of the present disclosure of invention will become more apparent by describing in detailed example embodiments thereof with reference to the accompanying drawings, in which.

DETAILED DESCRIPTION

Hereinafter, the present teachings will be explained in greater detail with reference to the accompanying drawings.

Figure 1:
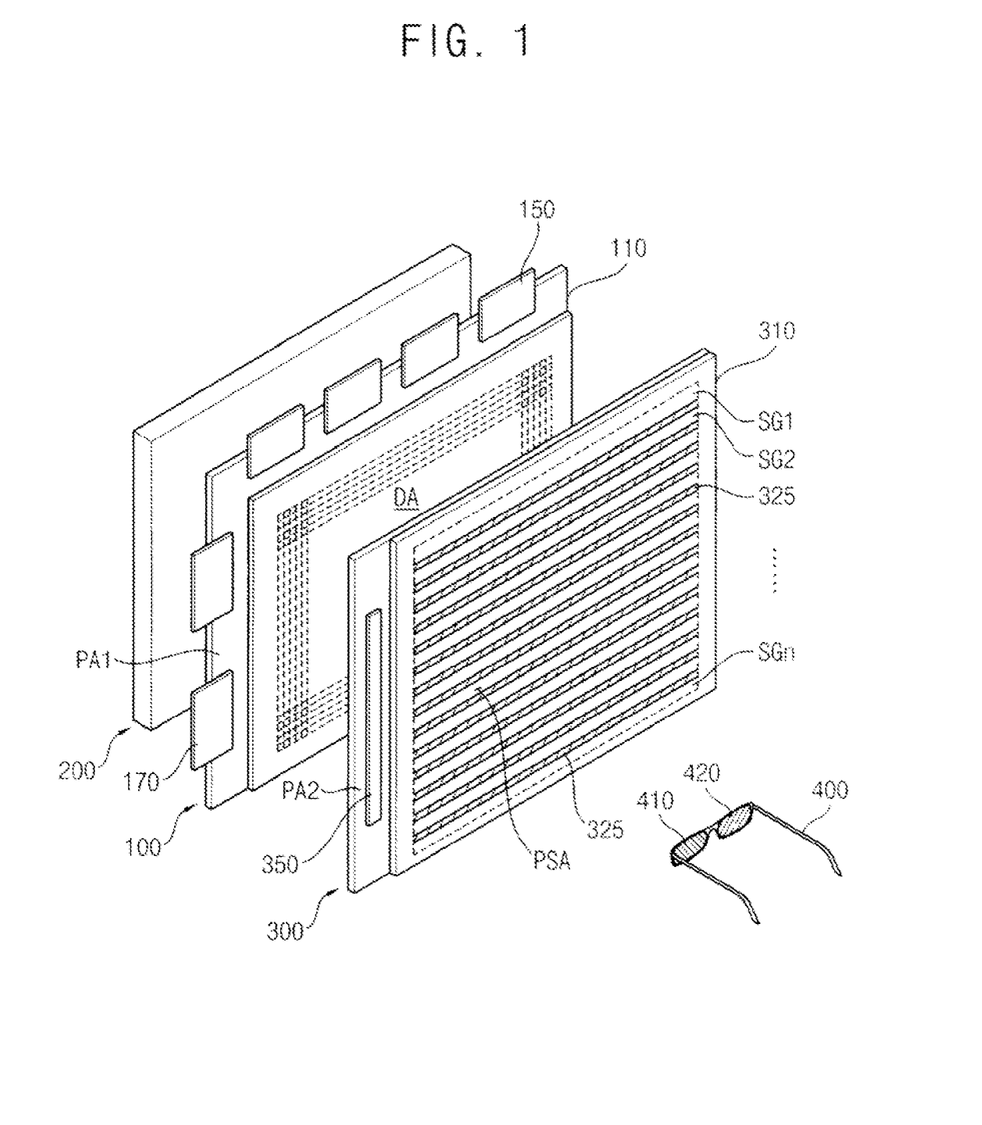
FIG. 1 is a perspective view schematically showing a display device according to an exemplary first embodiment of the present disclosure.
Figure 2:
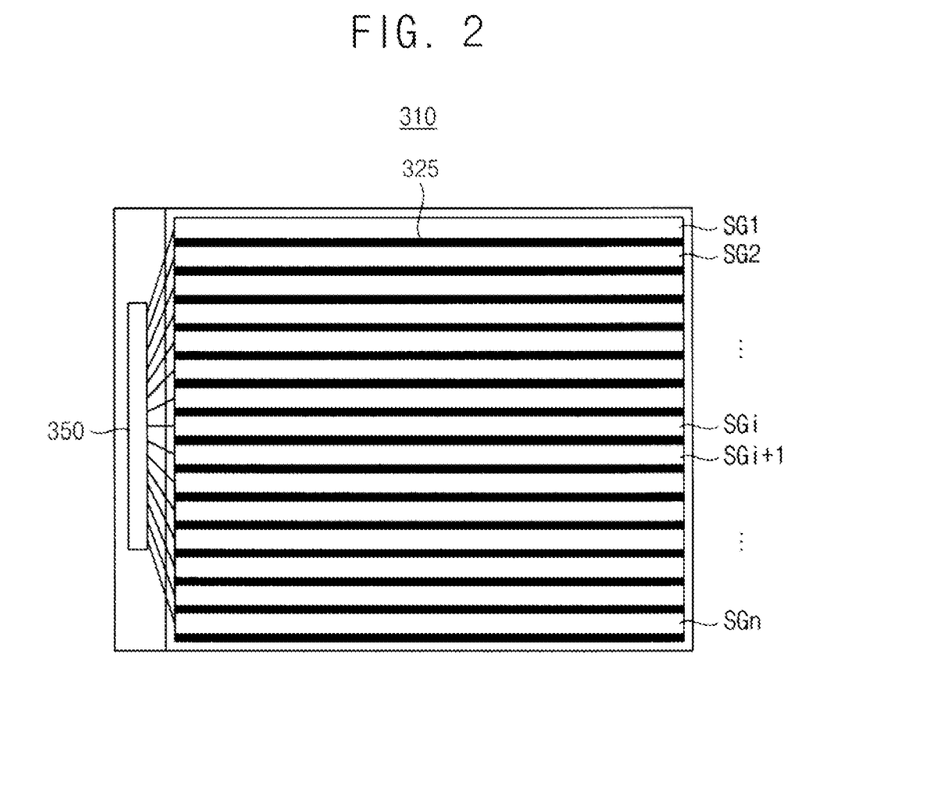
FIG. 2 is a plan view showing a polarizing module shown in FIG. 1.

FIG. 1 is a perspective view schematically showing a display device according to an exemplary first embodiment in accordance with the present disclosure. FIG. 2 is a plan view showing a polarizing module shown in FIG. 1.

Referring to FIGS. 1 and 2, the display device of the first embodiment includes a display module 100, a backlighting light source module 200 disposed behind the display module 100, a polarizing module 300 disposed in front of the display module 100 and a set of polarizing glasses 400 that are to be worn by the user.

The display module 100 includes a display panel 110, a data lines driving part 150 and a gate lines driving part 170. The display panel 110 includes a display area DA and a first peripheral area PA1 surrounding the display area DA.

A plurality of data lines, a plurality of gate lines and a plurality of pixels are disposed on a display area DA of the display panel 110. The gate lines cross with the data lines. The pixels may be arranged as a matrix so as to define a plurality of pixel rows and a plurality of pixel columns. Each pixel typically includes a switching element (e.g., a TFT transistor) connected to an adjacent data line and to an adjacent gate line. The pixel typically further includes a light-passing pixel electrode connected to and selectively driven by the switching element. The data lines driving part 150 and the gate lines driving part 170 may be disposed within the first peripheral area PA1 of the display panel 110. The pixel typically further has a black matrix (BM) surrounding it and disposed for blocking uncontrolled light from leaking through around peripheral edges of the pixel.

The data lines driving part 150 provides the data lines with respective data signals.

The gate lines driving part 170 provides the gate lines with respective gate signals. The gate lines driving part 170 may be directly formed (monolithically integrated) on the first peripheral area PA1 of the display panel 110 through a same process used for forming the switching elements of the display area DA.

The light source module 200 is disposed under (behind) the display panel 110 to include a light source providing the display panel 110 with lights. The light source may be a one or more florescent lamps, light-emitting diodes (LEDs), etc. For one example, the light source module 200 may be of an edge illumination type structure in which one or more light sources are disposed at least along one edge of a light guide plate (LGP) to thereby provide the display panel 110 with backlighting lights. For another example, the light source module 200 may have a direct illumination type of structure in which plural light sources are distributively disposed under the display panel 110 to provide the display panel 110 with lights.

The polarizing module 300 includes a polarizing panel 310 and a segments driving part 350.

The polarizing panel 310 may be electronically controlled to selectively transmit a first-way polarized light and a second-way polarized light depending on which of left and right eye images are then displayed on the display panel 110. The polarizing panel 310 includes a polarizing switching area PSA corresponding to the display area DA of the display panel 110 and a second peripheral area PA2 surrounding the polarizing switching area PSA.

A plurality of segment electrodes SG1, SG2, ..., SGn ('n' is a natural number) and a light-blocking member 325 are disposed in interdigitated manner on the polarizing switching area PSA of the polarizing panel 310 as shown. The segment electrodes SG1, SG2, ..., SGn ('i' is a natural number less than 'n') are longitudinally extended in a same longitudinally extending direction of the gate lines to be thus arranged along an arranging direction of the gate lines. In one embodiment, each of the segment electrodes SGi overlaps a plurality of pixel rows on the display panel 110. The light-blocking members 325 are disposed in interval areas between the segment electrodes. The light-blocking members 325 are structured to block lights from being leaked from the interval areas between the segment electrodes and to thus remove a crosstalk image component that may be generated due to differently angled light rays leaving the display panel 110. A segments driving part 350 is disposed on a second peripheral area PA2 of the polarizing panel 310. In one embodiment, the segments driving part 350 is monolithically integrated on a substrate and in the second peripheral area PA2 of the polarizing panel 310.

The segments driving part 350 provides the segment electrodes SG1, SG2, ..., SGn with driving signals. For example, when a left-eye image is being displayed on the display panel 110, the segments driving part 350 is turned on to apply a driving voltage of a first level to the segment electrodes SG1, SG2, ..., SGn so as to thereby provide a first electronically controlled polarizing effect. When a right-eye image is displayed on the display panel 110, the segments driving part 350 may be turned off (or otherwise differently operated) to apply a driving voltage of a second level to the segment electrodes SG1, SG2, ..., SGn and to thereby provide a different second electronically controlled polarizing effect. Thus, when the driving voltage of the first level is applied to the segment electrodes SG1, SG2, ..., SGn, the polarizing panel 310 transmits a first polarized light having a first polarizing axis and blocks a second polarized light having a second polarizing axis. When the driving voltage of the second level is applied to the segment electrodes SG1, SG2, ..., SGn, the polarizing panel 310 transmits the second polarized light having the second polarizing axis and blocks the first polarized light having the first polarizing axis.

The polarizing glasses 400 may include a left-eye lens 410 and a right-eye lens 420. The left-eye lens 410 transmits the first polarized light having the first polarizing axis and substantially blocks the second polarized light having the second polarizing axis. The second right-eye lens 420 transmits the second polarized light having the second polarizing axis and substantially blocks the first polarized light having the first polarizing axis.

Therefore, when the left-eye image is displayed on the display panel 110, the polarizing panel 310 transmits the first polarized light so that a viewer views the left-eye image through only (essentially) the left-eye lens 410. Moreover, when the right-eye image is displayed on the display panel 110, the polarizing panel 310 transmits the second polarized light so that a viewer views the right-eye image through only (essentially) the right-eye lens 420.

Figure 3:
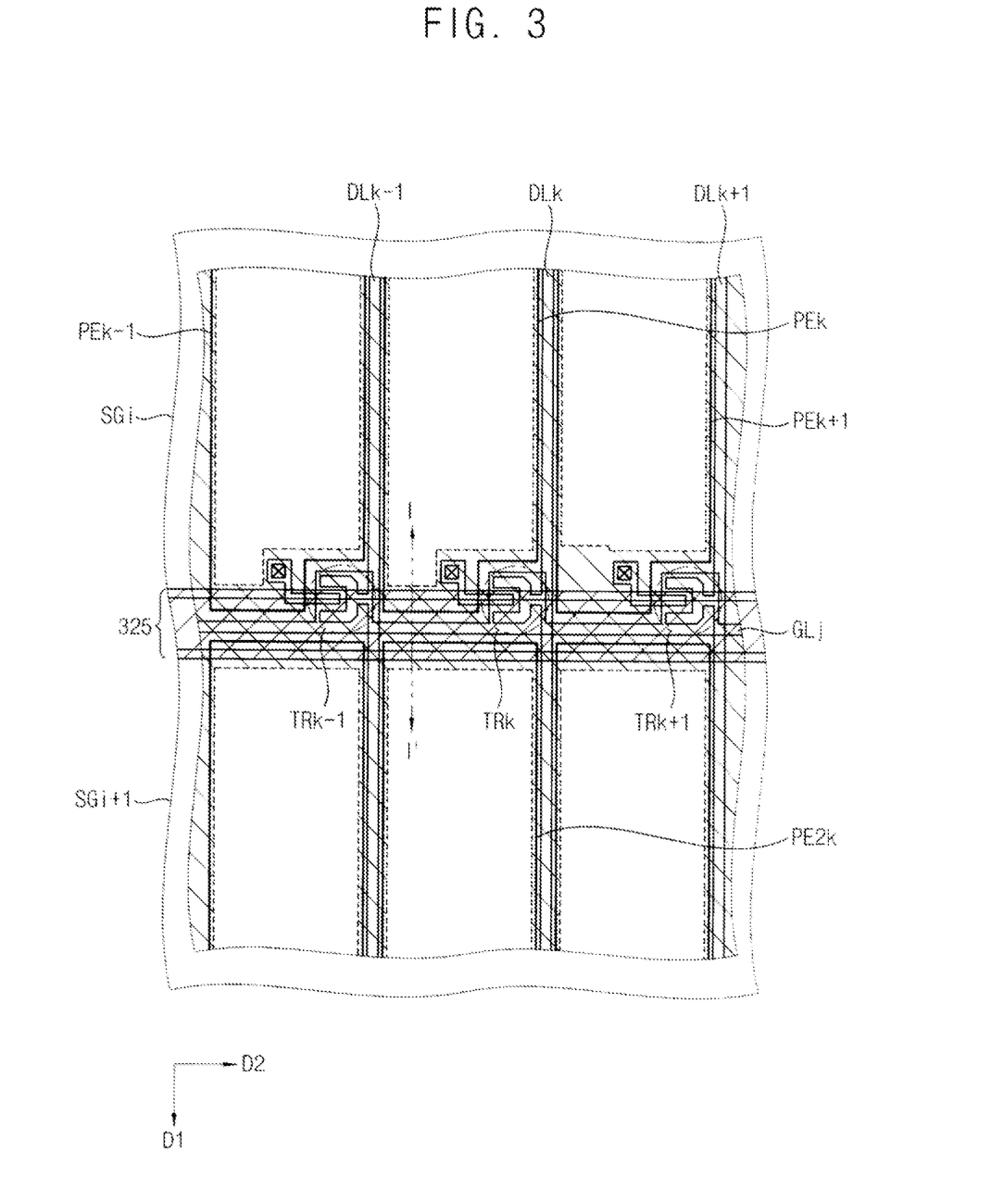
FIG. 3 is a plan view showing a display device shown in FIG. 1.
Figure 4:
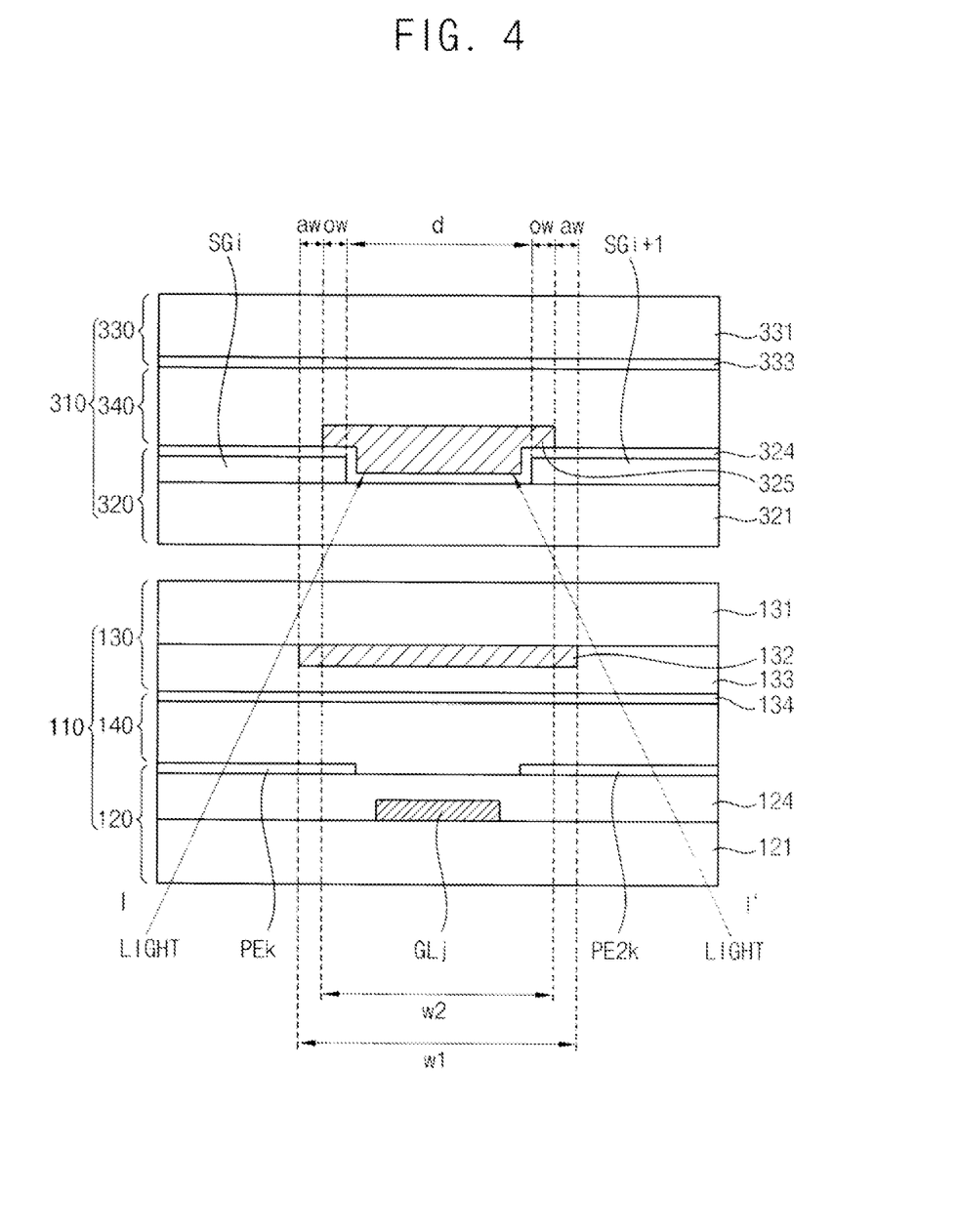
FIG. 4 is a cross-sectional view taken along the line I-I' of FIG. 3.

FIG. 3 is a plan view showing a display device shown in FIG. 1. FIG. 4 is a cross-sectional view taken along the line I-I' of FIG. 3.

Referring to FIGS. 1, 3 and 4, the display device includes the display panel 110 and the polarizing panel 310.

The display panel 110 includes a first substrate 120, a second substrate 130 and a first liquid crystal material layer 140 interposed between the first and second substrates, 120 and 130. The first substrate 120 (a.k.a. as TFT array substrate) includes a first base substrate 121, a plurality of data lines DLk−1, DLk and DLk+1, a plurality of gate lines GLj, a plurality of switching elements TRk−1, TRk and TRk+1, and a plurality of pixel electrodes PEk−1, PEk and PEk+1. The data lines DLk−1, DLk and DLk+1 are longitudinally extended along a first direction D1 to be arranged in spaced apart fashion along a second direction D2. The gate lines GLj are longitudinally extended along the second direction D2 to be arranged in spaced apart fashion along the first direction D1. The switching elements PEk−1, PEk and PEk+1 are electrically connected to the data lines DLk−1, DLk and DLk+1, the gate lines GLj and the pixel electrodes PEk−1, PEk and PEk+1. The pixel electrodes PEk−1, PEk and PEk+1 may include an optically transparent and electrically conductive material (e.g., ITO or IZO). In this case, 'k' and 'j' are natural numbers.

The first substrate 120 may further include an insulation layer 124 that is formed on the gate lines GLj, the data lines DLk−1, DLk and DLk+1 and the switching elements TRk−1, TRk and TRk+1. The insulation layer 124 may include plural layers formed by the different materials (e.g., organic and/or inorganic).

The second substrate 130 (a.k.a. common electrode substrate) includes a second base substrate 131, a first light-blocking member (BM) 132, a color filter 133 and a first common electrode 134. The second base substrate 131 faces the first base substrate 121. The first light-blocking member 132 is disposed on the second base substrate 131 in correspondence with an area on which the gate lines GLj, the data lines DLk−1, DLk and DLk+1 and the switching elements TRk−1, TRk and TRk+1 are formed. The first light-blocking member 132 may include a photo-sensitive organic material (e.g., photoresist) that for example is colored to block light. The color filter 133 is disposed on the second base substrate 131 in correspondence with an area on which the pixel electrodes PEk−1, PEk and PEk+1 are formed. The first common electrode 134 is disposed on the second base substrate 131 to be opposite to the pixel electrodes PEk−1, PEk and PEk+1.

For example, the first light-blocking member 132 overlaps with the j-th gate line GLj to fully cover the j-th gate line GLj. The first light-blocking member 132 is formed to overlap with an end portion of a k-th pixel electrode PEk and an end portion of an adjacent 2k-th pixel electrode PE2k (in the next row).

The first liquid crystal material layer 140 is disposed between the first and second substrates 120 and 130 to control a luminance of lights in accordance with an electric field force (voltage) applied between the pixel electrodes PEk−1, PEk and PEk+1 and the first common electrode 134.

The polarizing panel 310 includes a third substrate 320, a fourth substrate 330 and a second liquid crystal material layer 340 interposed between the third and fourth substrates, 320 and 330.

The third substrate 320 includes a third base substrate 321, a plurality of segment electrodes SGi and SGi+1 and a second light-blocking member 325. The third substrate 320 may further include an insulation layer 324 interposed between the segment electrodes SGi and SGi+1 and the second light-blocking member 325. Alternatively, the third insulation layer 324 may be omitted.

The segment electrodes SGi and SGi+1 are longitudinally extended along the second direction D2 to be arranged as spaced apart along the first direction D1. For example, an i-th segment electrode SGi overlaps with pixel electrodes corresponding to plural pixel rows that are positioned on an upper portion of the display area that covers rows from a zero-th gate line $GL_0$ to a j-th gate line GLj. An (i+1)-th segment electrode SGi+1 is spaced apart from the i-th segment electrode SGi to be overlapped with pixel electrodes corresponding to plural pixel rows positioned on a next lower portion of the display area that covers rows from a (j+1)-th gate line GL(j+1) to a k-th gate line GLk. The segment electrodes SGi and SGi+1 may include an optically transparent and electrically conductive material. For example, the optically transparent and electrically conductive material may be indium tin oxide (ITO), indium zinc oxide (IZO), amorphous indium tin oxide (ITO), and so on.

The second light-blocking member 325 is disposed within an interval area of the segment electrodes SGi and SGi+1. The second light-blocking member 325 may be an identical material as used for the first light-blocking member 132. The second light-blocking member 325 may include, for example, a photo-sensitive material. For example, the second light-blocking member 325 may be disposed within an interval area between the i-th and (i+1)-th segment electrodes SGi and SGi+1 to overlap with end portions of the i-th and (i+1)-th segment electrodes SGi and SGi+1. Moreover, the second light-blocking member 325 fully covers an area where the j-th gate line GLj is formed to be disposed within an area where the first light-blocking member 132 is formed. Thus, the second light-blocking member 325 may prevent a crosstalk between an image by a data voltage applied to the k-th pixel electrode PEk for a current frame and an image by a data voltage applied to the k-th pixel electrode PEk for a previous frame, in accordance with a progressive driving method of the display panel 110. In other words, the segment electrodes, SGi, SGi+1, etc. are progressively activated in lagging synchronization with the activation of the corresponding gate lines so that the underlying image on the display panel has stabilized between image frames before the corresponding segment electrode is activated to let through the appropriately polarized light rays from that panel region. More specifically, in the case where the second light-blocking member 325 is disposed between the segment electrodes SGi and SGi+1, SGi is activated first and then there is a lag until SGi+1 is activated after its underlying pixel rows have been refreshed. The position of the second light-blocking member 325 in FIG. 4 may be varied. For example it may be disposed below third insulator 324 and directly on the third base substrate 321.

The fourth substrate 330 includes a fourth base substrate 331 and a second common electrode 333. The fourth base substrate 331 is combined with the third base substrate 321. The second common electrode 333 is disposed on the second base substrate 131 to face the segment electrodes SGi and SGi+1. The second liquid crystal layer 340 is disposed between the third and fourth substrates 320 and 330 to transmit a first polarized light or a second polarized light in accordance with electric field forces (voltages) applied between the respective segment electrodes SGi and SGi+1 and the second common electrode 333.

In one embodiment, the first light-blocking member 132 of the display panel 110 has a first width dimension w1, and the second light-blocking member 325 of the polarizing panel 310 has a second width dimension w2 that is narrower than the first width w1. That is, the first width w1 of the first light-blocking member 132 may be greater than the second width w2 of the second light-blocking member 325 where this difference provides a margin of error consideration for a too low (under) or too above (over) alignment margin error; "aw" or "ow". The align margin "aw" is considered with an align margin between the display panel 110 and the polarizing panel 310. The align margin "aw" may be determined in accordance with an assembly process. Moreover, due to w2 being smaller than w1, the second light-blocking member 325 does not fully cover and thus can allow viewing of the first light-blocking member 132 during assembly. The overlap margin "ow" is a minimum overlap width between the second light-blocking member 325 and the i-th and (i+1)-th segment electrodes SGi and SGi+1. The overlap margin "ow" has a width capable of blocking a crosstalk component which is generated by the display panel 110. The overlap margin "ow" may be determined in consideration with a distribution of an exposure device, a material property of a light-blocking member, etc.

For example, when a first width w1 of the first light-blocking member 132 is about 44 μm and an interval distance d of the i-th and (i+1)-th segment electrodes SGi and SGi+1 is about 7 μm, a second width w2 of the second light-blocking member 325 may be about 17 μm in consideration to the interval distance d, the align margin "aw" and the overlap margin "ow". In this case, the align margin aw may be about 13.5 μm, and the overlap margin "ow" may be about 5 μm.

Figure 5:
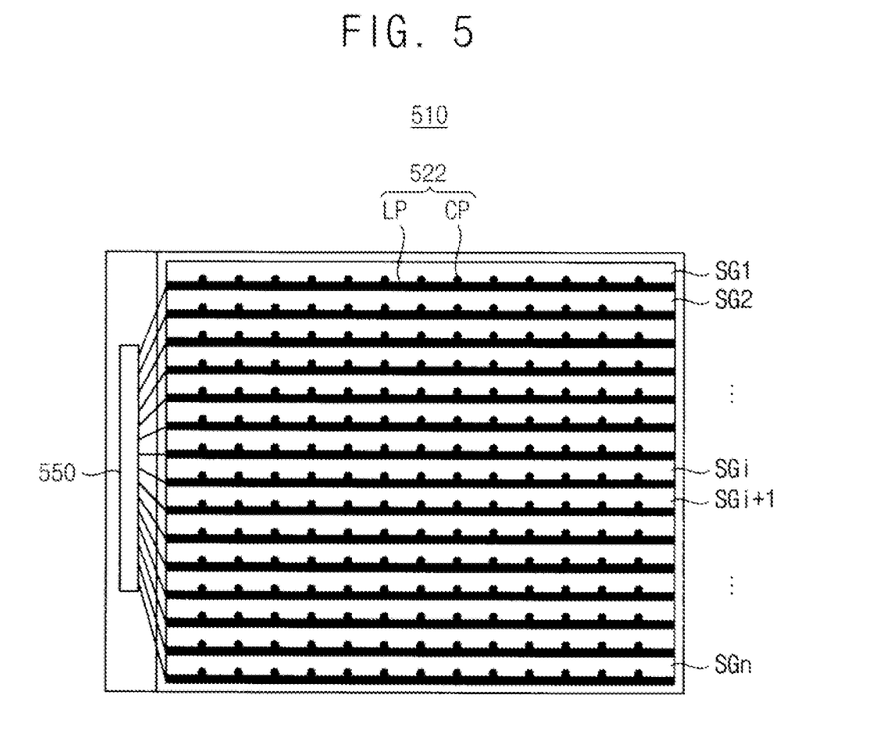
FIG. 5 is a plan view showing a polarizing module according to another exemplary embodiment.

FIG. 5 is a plan view showing a polarizing module according to another exemplary embodiment.

The display device of FIG. 5 is substantially the same as the display device of FIG. 1 except for the polarizing module. Thus, the same reference numerals will be used to refer to the same or like parts as those described above, and any repetitive detailed explanation will be omitted.

The polarizing module 510 of FIG. 5 includes a respective polarizing panel 520 and a corresponding segments driving part 550.

A plurality of segment electrodes SG1, SG2, . . . , SGn and a light-blocking member 522 are disposed on the polarizing switching area PSA of the polarizing panel 520.

The light-blocking member 522 includes a line part LP and a contact portion CP branching therefrom. The light part LP is formed on an interval area of the segment electrodes SG1, SG2, . . . , SGn. The contact portion CP is protruded from the line part LP to be electrically connected to the immediately above segment electrode SG1, SG2, ..., SGn, respectively. The light-blocking member 522 may block a crosstalk due to the display panel 110, and when formed to include an electrically conductive metal, may improve a resistance-capacitance (RC) delay difference of a driving voltage applied to the segment electrodes SG1, SG2, ..., SGn, respectively.

The segments driving part 550 provides the segment electrodes SG1, SG2, ..., SGn with driving signals. For example, when a left-eye image is disposed on the display panel 110, the segments driving part 550 is turned on to apply a driving voltage of a first level to the line part LP of the light-blocking member 522. The driving voltage of the first level is applied to the segment electrodes SG1, SG2, ..., SGn through the corresponding contact portions CP of the respective light-blocking member 522. When a right-eye image is displayed on the display panel 110, the segments driving part 550 is turned off to apply a driving voltage of a second level to the line part LP of the light-blocking member 522. The driving voltage of the second level is applied to the segment electrodes SG1, SG2, ..., SGn through the corresponding contact portions CP of the respective light-blocking member 522. Thus, when the driving voltage of the first level is applied to the segment electrodes SG1, SG2, ..., SGn, the polarizing panel 510 transmits a first polarized light having a first polarizing axis and blocks a second polarized light having a second polarizing axis. When the driving voltage of the second level is applied to the segment electrodes SG1, SG2, ..., SGn, the polarizing panel 510 transmits the second polarized light having the second polarizing axis and blocks the first polarized light having the first polarizing axis.

The driving voltage is applied to the segment electrode through the light-blocking member 522 formed from a metal layer where the metal layer has lower resistance than the segment electrode, so that a RC delay factor of the polarizing panel which is employed in a large size display device may be reduced.

Figure 6:
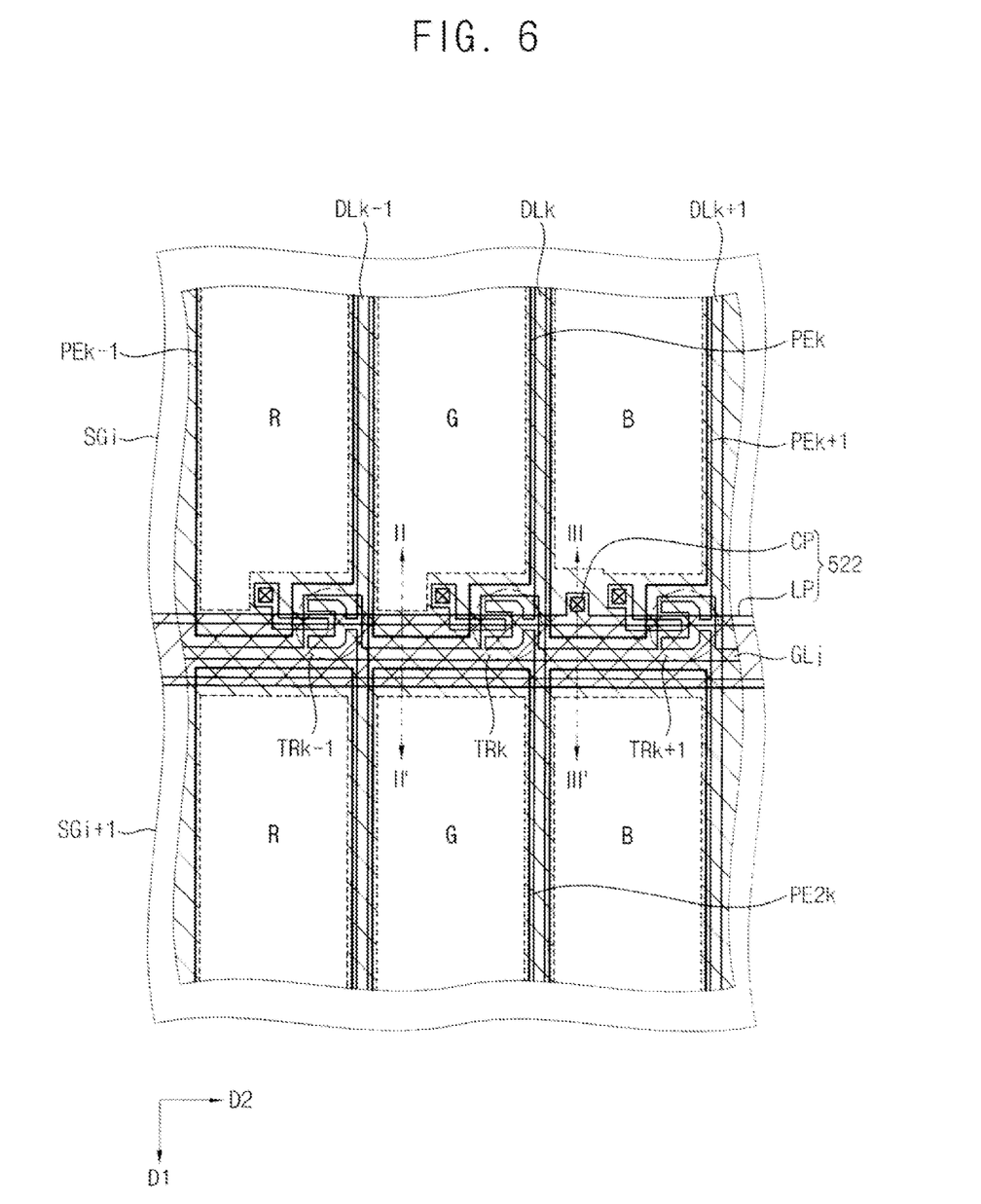
FIG. 6 is a plan view showing a display device having a polarizing module of FIG. 5.
Figure 7:
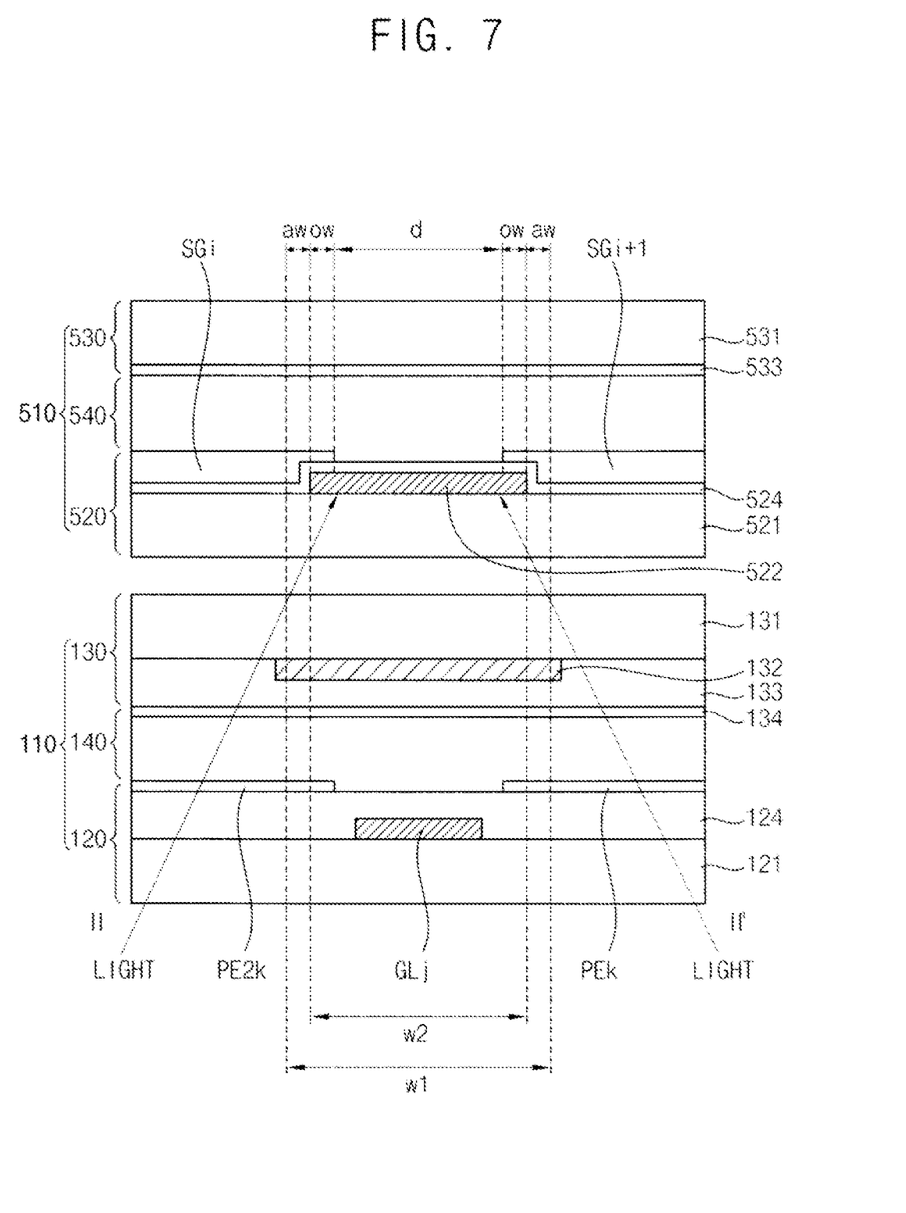
FIG. 7 is a cross-sectional view taken along the line II-II' of FIG. 6.

FIG. 6 is a plan view showing a display device having a polarizing module of FIG. 5. FIG. 7 is a cross-sectional view taken along the line II-II' of FIG. 6.

Referring to FIGS. 5 and 6, the polarizing panel 510 includes a third substrate 520, a fourth substrate 530 and a second liquid crystal layer 540. The third substrate 520 includes a third base substrate 521, a second light-blocking member 522 and a plurality of segment electrodes SGi and SGi+1. In this case, 'i' is a natural number.

The second light-blocking member 522 includes a line part LP and a contact portion CP branching contiguously therefrom.

The line part LP is disposed on an interval area of the segment electrodes SGi and SGi+1, and the contact portion CP is protruded from the line part LP to be connected to the corresponding segment electrode SGi for example through a contact hole. The metal layer of the second light-blocking member 522 may include, for example, a metallic material such as chromium (Cr), aluminum (Al), tantalum (Ta), molybdenum (Mo), titanium (Ti), tungsten (W), copper (Cu), silver (Ag), etc., or a metal alloy thereof. The metal layer may have at least a two-layered structure of metallic materials having different physical characteristics for the each layer. For example, the metal layer includes a first metal layer and a second metal layer that is sequentially formed on the first metal layer. The first metal layer includes at least one of aluminum (Al) and an aluminum alloy. The second metal layer includes at least one of molybdenum (Mo) and a molybdenum (Mo) alloy.

The contact portion CP is positioned within an area in which the first light-blocking member 132 is formed. For example, the contact portion CP may be positioned at an area in which a color filter that affects a luminance in small is formed. For example, when the display panel 110 includes a red (R) filter, a green (G) filter and a blue (B) filter, the contact portion CP may be positioned at an area where the blue (B) filter having a wide area at the first light-blocking member 132 is formed. Alternatively, the contact portion CP may be positioned at an area where another color filter such as a red (R) filter or a green (G) filter is formed. As a result, the contact portion CP may be formed within an area where an aperture ratio of a given color plane (e.g., blue) of the display panel 110 is not substantially damaged.

The segment electrodes SGi and SGi+1 are longitudinally extended in the second direction D2 so as to be arranged as spaced apart in the first direction D1. For example, an i-th segment electrode SGi is overlapped with pixel electrodes corresponding to plural pixel rows positioned at an upper portion of the j-th gate line GLj when viewed from a plan view. A (i+1)-th segment electrode SGi+1 is spaced apart from the i-th segment electrode SGi to overlap with pixel electrodes corresponding to plural pixel rows positioned at a lower portion of the j-th gate line GLj when viewed from a plan view.

The first light-blocking member 132 of the display panel 110 has a first width w1, and the second light-blocking member 522 of the display panel 110 has a second width w2 that is narrower than the first width w1. That is, the first width w1 of the first light-blocking member 132 is greater than the second width w2 of the second light-blocking member 522 in consideration with an align margin "aw" and an overlap margin "ow". The align margin "aw" is considered with an align margin between the display panel 110 and the polarizing panel 510. The align margin "aw" may be determined in accordance with an assembly process. Moreover, due to the align margin width "aw", the second light-blocking member 522 is not viewed by the first light-blocking member 132. The overlap margin "ow" is a minimum overlap width between the second light-blocking member 522 and the i-th and (i+1)-th segment electrodes SGi and SGi+1. The overlap margin "ow" has a width capable of blocking a crosstalk component which is generated by the display panel 110. The overlap margin "ow" may be determined in consideration with a distribution of an exposure device, a material property of a light-blocking member, etc.

For example, when the first width w1 of the first light-blocking member 132 is about 44 μm and an interval distance "d" of the i-th and (i+1)-th segment electrodes SGi and SGi+1 is about 7 μm, the second width w2 of the second light-blocking member 522 may be about 14 μm in consideration with the align margin "aw" and the overlap margin "ow". In this case, the align margin "aw" may be about 15 μm, and the overlap margin "ow" may be about 3.5 μm. The overlap margin width "ow" may be smaller than an overlap margin width of the second light-blocking member 522 formed from a sensitive organic material described in FIG. 4. For example, the overlap margin width "ow" may be smaller than about 5 μm. That is, since a process for an exposure device of a metal material is finer than a process for an exposure device of the organic material, the overlap margin width "ow" may be reduced.

The overlap margin "ow" of the light-blocking member may be in a range of 3 μm to about 5 μm, and the align margin width "aw" may be in a range of 13 μm to about 15 μm.

Figure 8:
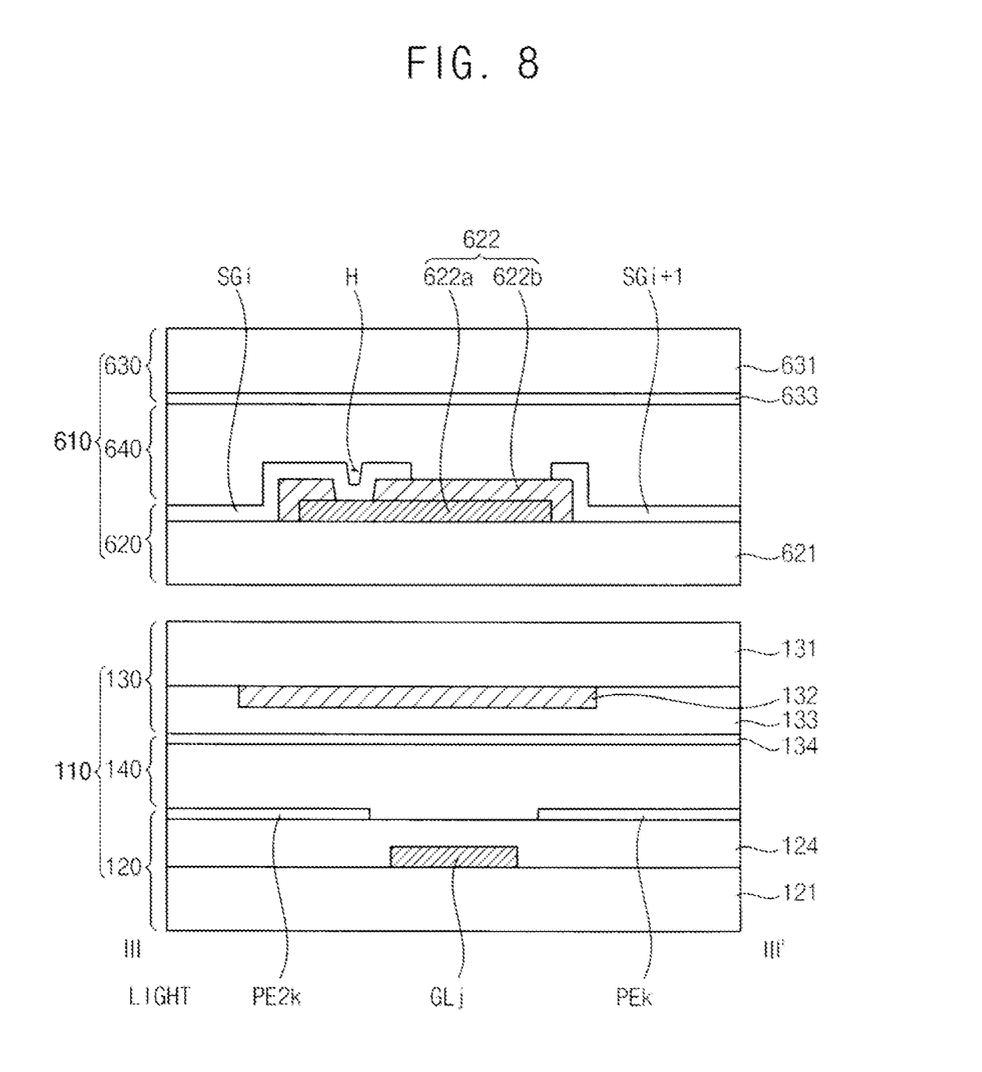
FIG. 8 is a cross-sectional view of a display device according to still another exemplary embodiment.

FIG. 8 is a cross-sectional view of the display device of FIG. 6. That is, FIG. 8 is a cross-sectional view taken along a line III-III' of FIG. 6. FIG. 8 shows the contact hole H.

Alternatively the display device of FIG. 8 is substantially the same as the display device of FIG. 6 except for inclusion of a multi-layer light blocking member 622 having a first light-blocking layer 622a and a second light-blocking layer 622b. Thus, other than that, the same reference numerals will be used to refer to the same or like parts as those described above, and any repetitive detailed explanation will be omitted.

The polarizing panel 610 includes a third substrate 620, a fourth substrate 630 and a second liquid crystal layer 640. The third substrate 620 includes a third base substrate 621, a second light-blocking member 622 and a plurality of segment electrodes SGi, SGi+1. In this case, 'i' is a natural number.

The second light-blocking member 622 includes a line part LP and a contact portion CP, as shown in FIG. 6. The second light-blocking member 622 may include a multilayer structure including a first light-blocking layer 622a and a second light-blocking layer 622b. The first light-blocking layer 622a may include a metal material having a high reflectivity as well as good electrical conductance. The second light-blocking layer 622b may be formed to overlap with the first light-blocking layer 622a. The second light-blocking layer 622b may include an organic material which is light absorbing. For one example, the second light-blocking layer 622b may include a non-transparent material that is the same as the first light-blocking member 132. For another example, the second light-blocking layer 622b may include a transparent material.

The contact portion CP extend s into a contact hole H formed through the second light-blocking layer 622b. The contact hole H may be formed by removing a portion of the organic material without a mask in a process of patterning the second light-blocking layer 622b. A position of the contact portion CP may be substantially the same as the exemplary embodiment described above.

The second light-blocking member 622 directly receives a driving voltage provided from the segments driving part, and the segment electrodes SGi and SGi+1 receive the driving voltage through the second light-blocking member 622.

The second light-blocking member 622 has the overlap margin width "ow" and the align margin "aw" with respect to the first light-blocking member 132. The overlap margin width "ow" and the align margin "aw" may be substantially the same as the exemplary embodiment described above.

The second light-blocking member 622 blocks a light leakage through an interval area between the segment electrodes SGi and SGi+1, so that a crosstalk generating factor due to the display panel 110 may be removed. Moreover, the driving voltage is applied to the segment electrode through the second light-blocking member 622 including the first light-blocking layer 622a that is a metal layer, so that an undesirable RC delay factor of the polarizing panel which is employed in a large size display device may be reduced.

Figure 9:
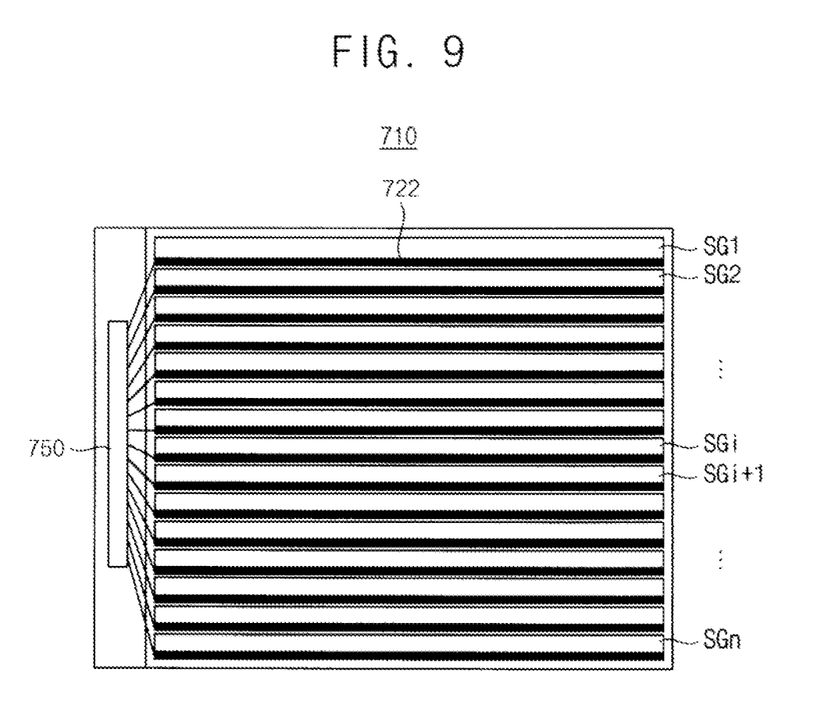
FIG. 9 is a plan view showing a polarizing module according to still another exemplary embodiment.

FIG. 9 is a plan view showing a polarizing module according to still another exemplary embodiment.

The display device of FIG. 9 is substantially the same as the display device of FIG. 1 except for the structured of the polarizing module. Thus, the same reference numerals will be used to refer to the same or like parts as those described above, and any repetitive detailed explanation will be omitted.

The polarizing module 710 includes a polarizing panel 720 and a segments driving part 750.

A plurality of segment electrodes SG1, SG2, . . . , SGn and a light-blocking member 722 are disposed on the polarizing switching area PSA of the polarizing panel 720.

The light-blocking member 722 may include an electrically conductive light-blocking material. The conductive light-blocking material may include a conductive organic material, a metal material, etc., which absorbs or reflect lights as well as being electrically conductive. The conductive light-blocking material may include chromium (Cr) and a chromium oxide (CrO).

The light-blocking member 722 is spaced apart from the segment electrodes SG1, SG2, . . . , SGn. The light-blocking member 722 is overlapped with an end portion of one of adjacent segment electrodes to makes contact to the end portion of one of adjacent segment electrodes.

The segments driving part 750 provides driving signals with the segment electrodes SG1, SG2, . . . , SGn. For example, when a left-eye image is displayed on the display panel 110, the segments driving part 750 is turned on to apply a driving voltage of a first level to the light-blocking member 722. When a right-eye image is displayed on the display panel 110, the segments driving part 750 is turned off to apply a driving voltage of a second level to the light-blocking member 722.

The light-blocking member 722 formed of the conductive light-blocking material blocks lights, so that the light-blocking member 722 may remove a crosstalk component of the display panel 110 and may reduce an undesirable RC delay factor of a driving voltage applied to the segment electrodes SG1, SG2, . . . , SGn.

Figure 10:
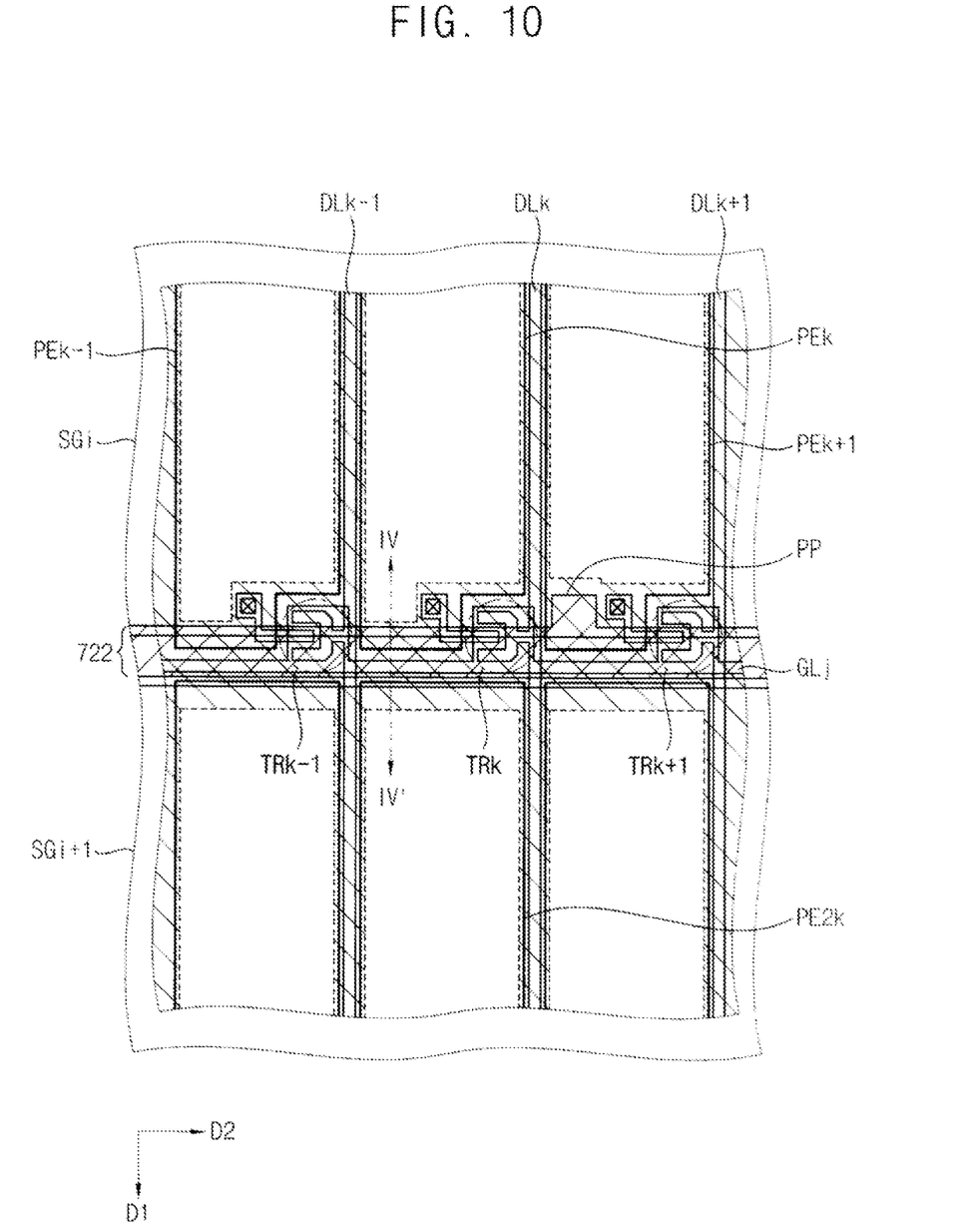
FIG. 10 is a plan view showing a display device having a polarizing module of FIG. 9.
Figure 11:
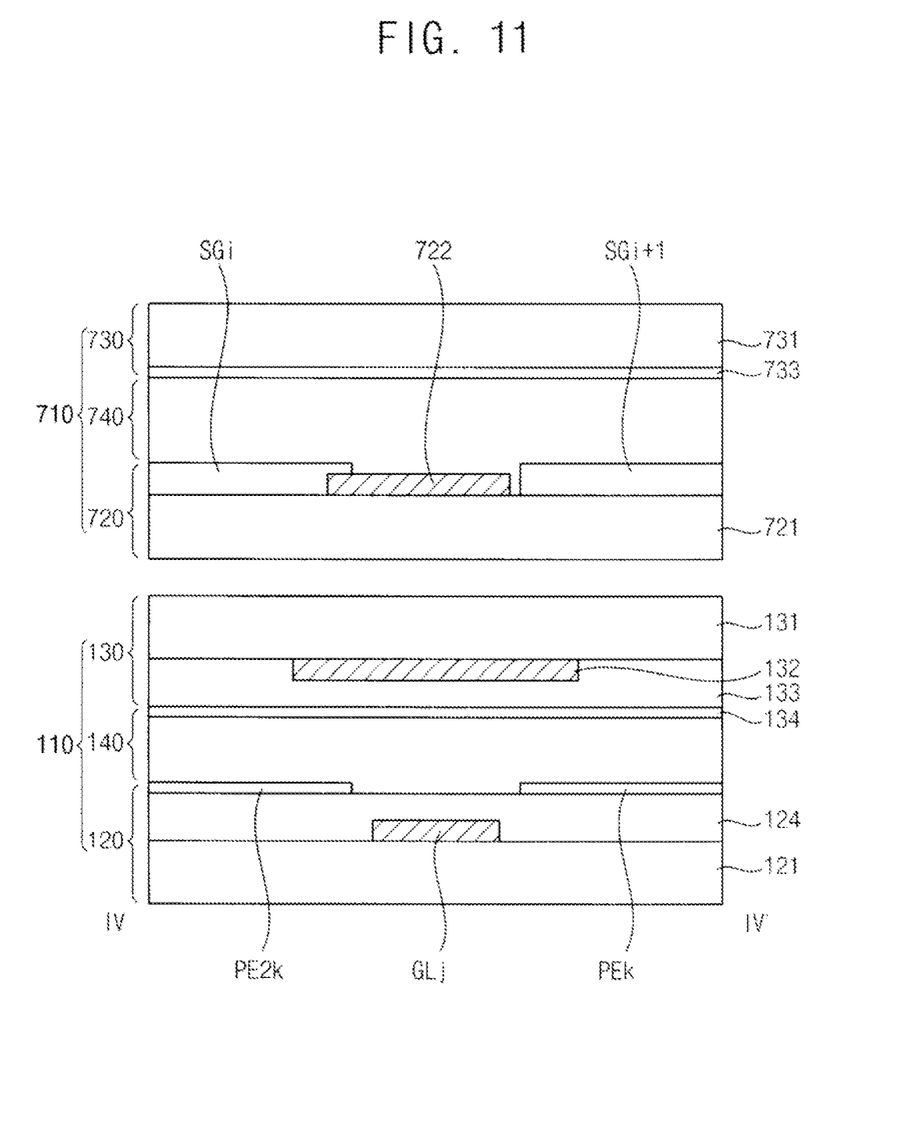
FIG. 11 is a cross-sectional view taken along the line IV-IV' of FIG. 10.

FIG. 10 is a plan view showing a display device having a polarizing module of FIG. 9. FIG. 11 is a cross-sectional view taken along the line IV-IV' of FIG. 10.

Referring to FIGS. 10 and 11, the polarizing panel 710 includes a third substrate 720, a fourth substrate 730 and a second liquid crystal layer 740. The third substrate 720 includes a third base substrate 721, a second light-blocking member 722 and a plurality of segment electrodes SGi, SGi+1. In this case, 'i' is a natural number.

The second light-blocking member 722 includes a conductive light-blocking material. The second light-blocking member 722 is disposed on an interval area between the i-th and (i+1)-th segment electrodes SGi and SGi+1. The second light-blocking member 722 is overlapped with an end portion of the i-th segment electrode SGi, and is spaced apart from the (i+1)-th segment electrode SGi+1. That is, a first end portion of the second light-blocking member 722 makes a direct electrical contact with an end portion of the i-th segment electrode SGi to be thus electrically connected to the i-th segment electrode SGi, and a second end portion of the second light-blocking member 722 is spaced apart from an end portion of the (i+1)-th segment electrode SGi+1 to be thus electrically isolated from the (i+1)-th segment electrode SGi+1. Moreover, the second light-blocking member 722 may include a protruding part PP protruding toward the i-th segment electrode SGi. That is, in consideration that an end portion of the second light-blocking member 722 does not make contact with an end portion of the i-th segment electrode SGi as layers are not aligned with each other, the second light-blocking member 722 includes the protruding part PP protruded toward the i-th segment electrode SGi, so that the end portion of the second light-blocking member 722 may make contact with the i-th segment electrode SGi through the protruding part PP in the area where the TFT transistor of the underlying display panel is disposed.

The second light-blocking member 722 is disposed within an area in which the first light-blocking member 132 is formed, and the first light-blocking member 132 is disposed to fully cover an area in which a second end portion of the second light-blocking member 722 is spaced apart from an end portion of the (i+1)-th segment electrode SGi+1. Thus, the first light-blocking member 132 may prevent lights from leaking from an interval area between the second end portion of the second light-blocking member 722 and the end portion of the (i+1)-th segment electrode SGi+1.

The fourth substrate 730 includes a fourth base substrate 731 and a second common electrode 733. The fourth base substrate 731 is combined with the third base substrate 721 to face the third base substrate 721. The second common electrode 733 is disposed on the second base substrate 131 to face the segment electrodes SGi and SGi+1. The second liquid crystal layer 740 is disposed between the third and fourth substrates 720 and 730. The second liquid crystal layer 740 transmits a first polarized light or a second polarized light in accordance with an electric field applied between the segment electrodes SGi and SGi+1 and the second common electrode 733.

The second light-blocking member 722 has the overlap margin width "ow" and the align margin "aw" with respect to the first light-blocking member 132. The overlap margin width "ow" and the align margin "aw" may be substantially the same as the exemplary embodiment described above.

The second light-blocking member 722 blocks a light leakage through an interval area between the segment electrodes SGi and SGi+1, so that a crosstalk due to the display panel 110 may be removed. Moreover, the driving voltage is applied to the segment electrode through the second light-blocking member 722 formed of a conductive light-blocking material, so that a RC delay factor of the polarizing panel which is employed in a large size display device may be reduced.

In exemplary embodiments described above, for convenience of description, the light-blocking member formed on the display panel is named as a first light-blocking member, and the light-blocking member formed on the polarizing panel is named as a second light-blocking member. However, a name of the first light-blocking member and a name of the second light-blocking member may be exchanged in accordance with a sequence of descriptions thereof.

According to exemplary embodiments of the present disclosure, a light-blocking member is formed on an interval area between segment electrodes, so that a crosstalk component may be prevented due to light-blocking effects. Moreover, a driving voltage is applied to the segment electrodes through a light-blocking member having good electrical conductivity, so that it may be employed in a large size display device.

The foregoing is illustrative of the present teachings and is not to be construed as limiting thereof. Although a few example embodiments in accordance with the present teachings have been described, those skilled in the art will readily appreciate in light of the foregoing that many modifications are possible in the example embodiments without materially departing from the novel teachings and advantages of the present disclosure. Accordingly, all such modifications are intended to be included within the scope of the present teachings. In the claims, means-plus-function clauses are intended to cover the structures described herein as performing the recited function and not only structural equivalents but also functionally equivalent structures.

What is claimed is:

1. A display device comprising:
a display panel configured to interleavingly display a left-eye image and a right-eye image;
a light source module configured to provide the display panel with lights;
a polarizing panel disposed in front of the display panel and comprising a plurality of spaced apart segment electrodes and one or more light-blocking members disposed in corresponding interval areas between adjacent ones of the spaced apart segment electrodes, the polarizing panel being structured to selectively apply a first polarizing effect to light rays passing therethrough when in a corresponding first state and to apply a different second polarizing effect to passing through light rays when in a corresponding second state, where the first and second states can be selectively chosen by voltages applied to the segment electrodes;
a plurality of gate lines longitudinally extended in a same longitudinally extending direction of the segment electrodes; and
a second light-blocking member overlapped with the gate lines.

2. The display device of claim 1,
wherein the one or more light-blocking members of the polarizing panel define a first light-blocking member, and
the first light-blocking member overlaps the second light-blocking member within an area in which the second light-blocking member is formed.

3. The display device of claim 2, further comprising:
a segments driving part configured and connected to apply respective driving voltages to the segment electrodes in synchronization with when the left-eye image is being displayed on at least part of the display pane, and in synchronization with when the right-eye image is displayed on at least part of the display panel.

4. The display device of claim 3, wherein the first light-blocking member is overlapped with an end portion of a first segment electrode and an end portion of a second segment electrode.

5. The display device of claim 4, wherein the first light-blocking member comprises a same material as the second light-blocking member.

6. The display device of claim 3, wherein the first light-blocking member comprises:
a line part disposed on the interval area; and
a contact portion protruded from the line part to be connected to the first segment electrode.

7. The display device of claim 6, wherein the first light-blocking member comprises a metal material.

8. The display device of claim 6, wherein the first light-blocking member comprises a first light-blocking layer comprising a metal material and a second light-blocking layer comprising an organic material.

9. The display device of claim 6, wherein the segments driving part directly applies the respective driving voltages to respective segment portions of the first light-blocking member.

10. The display device of claim 3, wherein the first light-blocking member is overlapped with an end portion of a first segment electrode by making contact with the end portion of the first segment electrode, and is spaced apart from an end portion of a second segment electrode.

11. The display device of claim 10, wherein the light-blocking member comprises at least one of a conductive light reflecting material and a light-blocking material.

12. The display device of claim 10, wherein the segments driving part directly applies the driving voltages to the first light-blocking member.

* * * * *